United States Patent Office 3,368,903
Patented Feb. 13, 1968

3,368,903
BAKED GOODS DOUGH AND METHOD
Robert H. Johnson and Eileen A. Welch, Norwalk, Conn., assignors to R. T. Vanderbilt Company, Inc., New York, a corporation of New York
No Drawing. Continuation-in-part of application Ser. No. 274,068, Apr. 19, 1963, which is a continuation-in-part of application Ser. No. 191,878, May 2, 1962. This application Feb. 18, 1966, Ser. No. 532,045
15 Claims. (Cl. 99—91)

ABSTRACT OF THE DISCLOSURE

A lipase preparation exhibiting activity in the pH range of 4.0 to 6.5, substantially free from deleterious amounts of proteinases, amylases and reducing substances, and which has the ability to increase the extractable monoglyceride content of a dough is added to a dough to retard the tendency of the baked goods obtained from the dough to become stale.

This application is a continuation-in-part of our co-pending application Ser. No. 274,068, filed Apr. 19, 1963, now abandoned, which, in turn, is a continuation-in-part of our application Ser. No. 191,878, filed May 2, 1962, now abandoned.

This invention relates to the production of improved baked products and more particularly to the production of bread, rolls and sweet goods that remain soft longer.

It has been established by marketing research that the housewife commonly selects bread on the basis of softness. A hard or firm feeling loaf of bread she adjudges stale even though it may be less than twelve hours from the oven. As a consequence of this tendency, most commercial bakers do everything possible to make their products soft.

Stale bread is sometimes sold at a discount but even this does not use a store's supply, and much of it is returned to the baker to be used as bread crumbs or sold as animal food. As such practices are wasteful and expensive, the baker is always concerned with better ways of solving the "stale-return" problem.

Soft bread is commonly produced by keeping baking time to a minimum, by adjusting the formula used, and by mixing, fermenting and handling the dough in such a way that the gas formed by the yeast is held in small cells having very thin cell walls. Mineral dough conditioners, malt syrup and invert syrup are ingredients often used for imparting softness.

Staleness in bread is accompanied by a number of changes. The loaf becomes progressively firmer, the crumb feels firmer, drier and more friable, and the flavor gradually changes. Rate of staling can be measured most satisfactorily by recording the increase in firmness of the crumb by some mechanical means, but methods measuring the decrease in ability of the crumb to absorb water and the decrease in its soluble starch content have also been used.

The actual mechanism of bread staling has been studied for nearly one hundred years and is still not definitely known. It was proved early, however, that staleness is independent of moisture content, since bread aged in completely moisture proof containers would still go stale. Later theories pointed toward an exchange of water between the starch and gluten fractions of the bread as the causative factor. These theories have since been considered of doubtful accuracy. The most recent theory suggests that staling is caused by a chemical or physical change in the starch fraction alone. This theory together with the observation that a loaf of stale bread may be freshened by heating, indicates that bread staling depends upon changes in the starch-water relationship. The starch-water relationship is known to change in starch pastes themselves which retrograde or set-up with age. It is considered likely that the same thing occurs in the partially gelatinized starch in a loaf of bread.

In an effort to combat the bread staling problem, most baked goods today contain one or more additives which, to a greater or lesser extent, will retard staling. One such additive consists largely of monoglycerides. Although these materials provide improved results, they may give undesirable changes in the cell structure of the bread. This is often associated with the use of monoglycerides made from fats having a high iodine number. The effect is more noticeable as the products containing monoglycerides are permitted to age.

It has now been found that the use of certain lipase preparations in a bread dough mixture will significantly retard the tendency of bread to become stale. At the same time, bread made in this manner exhibits none of the disadvantages usually encountered when monoglycerides are used as bread staling retarding additives. The lipase preparation is added to the bread dough along with flour, water, shortening, yeast and the other conventional ingredients. The dough is mixed until smooth and is thereafter handled in the conventional manner.

Lipases are enzymes which accelerate decomposition of triglyceride fats. The decomposition products are mainly diglycerides, monoglycerides, fatty acids and glycerine, the relative amounts and proportions of each depending upon the characteristics of the lipase preparation and the length of time over which it is permitted to act.

The lipases are individualistic in their behavior according to their source, conditions of preparation and use. Some produce an abundance of one end product at the expense of another. Some lipases are more effective in acid medium while others are more effective with fatty acids of a particular type and are relatively or completely ineffective with others. Some may be crystallized as pure materials; others, as extensive trials have shown, are not pure materials but are mixtures of active components which are ineffective when separated. Most commercial lipase preparations contain, in addition to lipase, other types of enzymes in appreciable quantities.

Lipase preparations which are useful according to this invention must contain lipases of the type which are capable of splitting triglyceride fats containing fatty acids having 12 or more carbon atoms. Also the lipase preparation must be one which is active at the pH of bread, which generally ranges from 4.0 to 6.5.

The lipase preparations of this invention may contain minimum amounts of extraneous active materials such as enzymes other than the lipases. Extraneous enzymes usually found in lipase preparations include proteinases and amylases. Although these may be desirable for some purposes, they are not essential to or related to the present invention. Lipase preparations also often contain reducing substances which are detrimental and should be kept at a minimum level.

Proteinases of some types in proper quantity are of value in the preparation of bread. Other types, on the other hand, are detrimental to bread quality. In selecting an appropriate lipase preparation, care must be taken to select one which does not have an excessive proteinase activity, as such preparations will provide a dough which becomes slimy and difficult to handle. Also, bread prepared with such preparations will lack volume, may have a dark crust, and the crumb will have a poor cell structure.

The presence of high levels of amylase may impair bread quality because of its action in modifying the starches present. The internal structure and color of the bread will be detrimentally affected and the amylase may cause crumbliness or stickiness in the bread.

Lipase preparations containing excessive amounts of reducing substances will impair bread quality. The bread will suffer most of the defects of a bread prepared with lipase preparations containing excessive levels of proteinases. It is believed that the reducing substances may act as activators of latent proteinases present in flour.

The lipase preparations of this invention are of benefit both in doughs containing added fat as shortening and in those doughs which do not use an added shortening increment. Flour ordinarily contains about 1.5% of lipid materials, most of which can be extracted by solvents such as acetone or ether. It has been noted that once flour has been made into dough by the addition of water and mixing, the lipids apparently become bound by the protein so that only about .15% of the lipids can be extracted by ether or acetone.

The use of the lipase prepartions according to this invention has a softening effect when used in doughs having no added shortening increment. While the exact mechanism is not known, it is thought that the lipase splits the natural flour lipids to form monoglycerides, and that these monoglycerides are, to some extent, preferentially bound by the flour protein, displacing the lipid component. The increased softness therefore is thought to be the added effect of the monoglyceride on the starch and the possible lipo-protein modifying action resulting from an increase in solvent-extractable lipids.

The following Examples 1 and 2 illustrate a method of preparing two preferred lipase preparations for use according to this invention.

EXAMPLE 1

Seeds from the plant *Vernonia anthelmintica*, commonly known as Indian ironweed, were used as a source of lipase enzyme. These seeds are described in the Journal of the American Oil Chemists' Society article by Krewson et al., July 1962 issue, volume 39, No. 7, pages 334–340. The seeds were processed to detach the hull from the endosperm and separation of the two fractions was achieved by air classification procedures. The endosperm fraction was then ground to a flour and immediately extracted with petroleum ether to remove the oil present therein. The extraction process was continued until a maximum of 1% oil on a dry weight basis remained in the endosperm material. The resulting product was the color of a light rye flour and the flour particles were soft and uniform in shape. This material, hereinafter described as defatted ironweed flour, had a high level of lipase activity.

The hull or bran fraction was extracted with petroleum ether in a separate procedure until it contained a maximum of 1% oil on a dry weight basis. This material consisted of dark, hard, irregularly shaped particles, and had a high level of lipase activity. This material will be hereinafter described as defatted ironweed bran.

EXAMPLE 2

ENZYME PREPARATION—RAPESEED

Twenty (20) grams of rapeseeds were ground in a mortar to a greasy paste. 100 ml. of distilled water were then added to the paste in small portions over a period of an hour with frequent grinding. The material was then transferred to a beaker and 50 ml. of water added. The mixture was refrigerated overnight. Fifty ml. of phthalate buffer of pH 4.5 were added and the mixture centrifuged. The cream was taken from the top of the tubes, washed with distilled water and again centrifuged. 5.5 grams of a lipase cream was obtained, which is hereinafter designated lipase preparation—Rapeseed (I).

A second lipase preparation was obtained from rapeseed in the manner described above, except that germinated seeds were used as the starting material. This preparation will be hereinafter designated as lipase preparation—Rapeseed (II).

EXAMPLE 3

Each of the lipase preparations prepared in Example 2 above, i.e., Rapeseed (I) and Rapeseed (II), were added to bread doughs and the doughs were baked. The breads obtained were compared with two controls, one a blank with no added enzyme or monoglyceride, the other with added monoglyceride but no added enzyme. A white pan bread was used in this test, and was made according to the following.

*Formula*

| Sponge: | Lbs. |
|---|---|
| Hard wheat flour | 60 |
| Water | 36 |
| Yeast | 2 |
| Yeast food | ¼ |
| Dough: | |
| Hard wheat flour | 40 |
| Water | 25 |
| Salt | 2 |
| Sugar | 3 |
| Dry milk | 4 |
| Shortening | 2 |
| Lipase preparation | ¼ |

*Procedure*

*Sponge.*—The yeast was dissolved in a portion of the water at 72° F., and the solution was added to a mixer along with flour, yeast food and the balance of the water. The materials were mixed just enough to make a homogeneous mass, dumped into a trough and fermented for 5½ hours at 72° F.

*Dough.*—The fermented sponge was returned to the mixer, all of the dough ingredients were added and the batch was mixed until smooth. The dough was allowed to stand about 15 minutes, divided, rounded and allower to stand again. It was then molded, panned, proofed at 95° F. to the top of the pans, and baked at 420° F. until uniformly brown, i.e., about 30 minutes with steam in the oven. The loaves were cooled slowly to room temperature and wrapped in moisture proof paper.

Representative samples were taken immediately after baking and analyzed for extractable monoglyceride content. Firmness of the resulting bread was measured objectively after three days using a Baker Compressimeter. The results obtained are shown in the following table.

TABLE 1

| | Control | (I) Rapeseed | (II) Rapeseed | ATMUL 122* |
|---|---|---|---|---|
| Firmness after 3 days, as percent of control | 100.0 | 87.5 | 92.5 | 81.0 |
| Percent reduction | | 12.5 | 7.5 | 19.0 |
| Grams of additive, per 1,800 g. flour | 0.0 | 5.0 | 5.0 | 9.4 |
| Extractable monoglyceride content of bread, as percent by weight of flour | .16 | .32 | .27 | .50 |
| Free fatty acid content of bread, as percent by wieght of flour | .12 | .20 | .72 | |

*ATMUL 122 is a commercially available monoglyceride reaction product produced by Atlas Chemicals Co. It contains 65 to 69% total monoglyceride, has not more than .5% free fatty acid, has a melting point of 125–127° F., and iodine value of 54–61 and is prepared from animal fat.

EXAMPLE 4

Defatted ironweed flour prepared according to Example 1 was used in a bread made according to the procedure and formula set forth in Example 3. The bread prepared in this manner was substantially softer than the control without lipase after 3 days of storage.

Defatted ironweed bran, also prepared according to Example 1, was used in a bread made according to the procedure and formula set forth in Example 3. The bread prepared in this manner was substantially softer than the control without lipase after 3 days of storage. However, the defatted ironweed bran imparted a dark color and slightly bitter taste to the bread. While the use of this material in white bread may be undesired for these reasons, it may be used in dark, strong-flavored breads where color and slight bitterness is not a problem.

It is noted that lipase preparations having similar levels of lipase activity may be prepared by defatting the crushed whole seed, followed by separation of bran and flour into separate fractions. In this event, the flour takes on some of the color and flavor of the hull or bran, and is useful only for the purposes set forth above for the defatted bran.

The level of lipase useful in bread is determined by its potency under conditions of use and the amount and type of shortening used. From experiments conducted thus far, amounts as small as 0.25 ounce of lipase per 100 pounds of flour may produce a measurable decrease in the staling rate.

The potency of a lipase is commonly expressed in terms of free fatty acids produced under standardized conditions. This, of course, is an index of its ability to split a triglyceride but is not necessarily a measure of its ability to produce monoglyceride. The value of lipase as an anti-staling agent in bread is more closely related to its potency expressed in terms of monoglyceride production than expressed in terms of free fatty acid production. Accordingly, its effectiveness may be gauged more accurately by the amount of extractable monoglyceride which is in the bread product.

Effective amounts of lipase should produce an increase in extractable monoglycerides of at least 0.5 ounce per 100 pounds of flour. The maximum amount of lipase required depends on the reduction in firmness and staling rate desired. In yeast raised sweet goods, for instance, the increase in extractable monoglycerides may be as much as 32 ounces per 100 pounds of flour.

Some monoglyceride is produced in bread during baking due to splitting of fats at elevated temperatures in the presence of water and salts. This monoglyceride may amount to 4 ounces per 100 pounds of flour. There is some evidence that this monoglyceride is formed too late in the bread making process to form anti-firming agents in bread. This monoglyceride is perhaps not "available" at a critical stage.

Whatever may be the effect of monoglyceride produced in the absence of lipase, it is clear that when lipase is added, more monoglyceride is produced, and the desirable anti-firming effects are noticed with the first increase in extractable monoglyceride.

EXAMPLE 5

Bread was baked with increments of defatted ironweed flour to determine its effect on third-day firmness and extractable monoglyceride. The bread was prepared by the procedure and formula set forth in Example 3, except that 4 pounds of lard were used. Firmness was measured by compression on an Intron testing machine. The bread was compressed by 25% of original thickness. Force required is given in arbitrary units. Extractable monoglyceride content is given as percent of extractable lipids, and in ounces per 100 pounds of flour. The results obtained were as follows:

| Defatted Ironweed Flour, as percent of Flour | Force Third Day Firmness | Extractable Monoglyceride as percent of Extractable Lipids | Extractable Monoglyceride in Ounces per 100 Pounds of Flour |
| --- | --- | --- | --- |
| .00 | 955 | 2.42 | 1.6 |
| .015 | 890 | 6.2 | 4.0 |
| .03 | 875 | 6.5 | 4.2 |
| .06 | 745 | 7.2 | 4.6 |
| .125 | 720 | 9.2 | 5.9 |
| .25 | 645 | 9.8 | 6.3 |

EXAMPLE 6

The defatted ironweed flour prepared in Example 1 was used to make brew bread. Brew bread is a term used to include continuous mixed bread and that made by batch processes wherein the major portion of fermentation occurs in a brew. This is in contrast to conventional bread where the major portion of fermentation occurs in a sponge. The essential difference between a brew and a sponge is the fact that the major portion of the brew is water, generally 60–90% of total weight, whereas in the sponge, water amounts to only 30–40% of total weight, the major part being flour. In this instance, the following formula and procedure were used.

Brew: Parts by wt.
  Water _____ 100.0
  Dried yeast _____ 1.65
  Sugar _____ 4.4
  Salt _____ 2.7
  Nonfat milk solids _____ 6.6
  Brew buffer [1] _____ 0.45

[1] Manufactured by Standard Brands, Inc., and composed of calcium carbonate, ammonium chloride, wheat flour, calcium sulfate and sodium chloride.

The brew is fermented for about three hours while held at 85–90° F. with agitation. Final pH should be about 5.3.

Dough: Parts by wt.
  Brew _____ 52
  Flour _____ 100
  Sugar _____ 6
  Salt _____ 0.75
  Shortening _____ 4
  Water _____ 18
  Yeast _____ 1
  Defatted ironweed flour (as indicated below).

The dough was mixed and processed conventionally, in the manner described in Example 3. Bread was held at a uniform temperature in a moisture proof container. Firmness was measured on the third day. Extractable monoglyceride was determined as shown in the table below.

|  | Control | Defatted Ironweed Flour | Defatted Ironweed Flour |
| --- | --- | --- | --- |
| Firmness of bread after 3 days as percent of control | 100 | 79 | 65 |
| Reduction of firmness as percent of control | 0 | 21 | 35 |
| Defatted Ironweed Flour as parts per 100 parts of flour, by weight | 0 | 0.135 | 0.405 |
| Shortening added as percent of weight of flour | 4 | 4 | 4 |
| Extractable monoglyceride of bread as percent of weight of liquid extract | 1.96 | 7.7 | 10.9 |

EXAMPLE 7

This example illustrates the use of lipase preparations to improve the quality of bread to which no shortening has been added. The formula and procedure of Example 3 were followed, except that the shortening was omitted, and the defatted ironweed flour of Example 1 was used as a source of lipase. The results were as follows:

|  | Control | Defatted Ironweed Flour |
| --- | --- | --- |
| Firmness of bread, as percent of control after 3 days | 100.0 | 83.0 |
| Reduction of firmness, as percent of firmness of control | 0.0 | 17.0 |
| Defatted Ironweed flour as percent of weight of flour | 0.0 | 0.30 |
| Added Shortening | 0.0 | 0.0 |
| Extractable monoglyceride, as percent of weight of lipid extract | 0.190 | 0.700 |
| Extractable lipids, as percent of weight of flour | 0.130 | 0.210 |
| Extractable monoglyceride, as percent of flour | 0.024 | 0.147 |

EXAMPLE 8

White pan bread was prepared according to the following recipes.

| Sponge: | Lbs. |
|---|---|
| Hard wheat flour | 70 |
| Water | 51 |
| Yeast (dry) | 1¼ |
| Yeast food | ¼ |
| Dough: | |
| Hard wheat flour | 30 |
| Water | 15 |
| Salt | 2 |
| Sugar | 5 |
| Dry milk | 4 |
| Shortening | 4 |
| Lipase preparation | ⅛ |

Procedure

*Sponge.*—The sponge was prepared by dissolving the yeast in a portion of the water at 110° F., and the solution was added to the mixer along with flour, yeast food and the balance of the water. The materials were mixed just enough to make a homogeneous mass, dumped into a trough and fermented for 3 hours at 78° F.

*Dough.*—The fermented sponge was returned to the mixer, all of the dough ingredients were added and the batch was mixed until smooth. The dough was allowed to stand about 15 minutes, divided, rounded and allowed to stand again. It was then molded, panned, proofed at 95° F. to the top of the pans, and baked at 420° F. until uniformly brown, i.e., about 30 minutes, with steam in the oven. The loaves were cooled slowly to room temperature and wrapped in moisture proof paper.

Representative samples were taken immediately after baking and analyzed for extractable monoglyceride content. Firmness of the resulting bread was measured objectively after three days using a Baker Compressimeter. The results obtained are shown in the following table:

TABLE 2

| | Lipase | Control (lipase omitted) |
|---|---|---|
| Firmness after 3 days as percent of control | 73 | 100 |
| Percent reduction with respect to control | 27 | 0 |
| Extractable monoglyderide content of bread as percent by weight of flour | .74 | .11 |

In the foregoing the lipase preparation used was obtained by cultivation of the microorganism *Candida cylindracea* ATCC No. 14830 in accordance with United States Patent No. 3,189,529 to Yamada et al., the disclosure of which is hereby incorporated by reference. As pointed out in that patent, lipase preparations may be prepared from *Candida cylindracea* No. 14830 which has been cultivated in a suitable medium at 20°–35° C. In these tests the lipase used had an activity of 21,000 u./g.

The enzyme unit is defined the amount of enzyme required to liberate 1 mole of fatty acid per minute under the following conditions:

Into a glass-stoppered Erlenmyer flask of 50 ml. capacity are placed 5 ml. of an olive oil emulsion and 0.4 ml. of a 0.1 M phosphate buffer having a pH of 7.0. The olive oil emulsion is prepared by blending 22.9 gm. of olive oil and 75 ml. of a 2% polyvinyl alcohol solution in a high-speed homogenizer. The contents of the flask are mixed well and heated to 37° C. on a water bath.

To this solution 1 ml. of a sample solution containing a known amount of a lipase preparation is added to the flask. The flask is shaken 15 seconds to disperse the enzyme, and then incubated at 37° C. for 20 minutes. After exactly 20 minutes, 20 ml. of a 50:50 acetone: ethanol solution and 5 drops of phenolphthaleine indicator are added. The contents of the flask are then titrated with 0.05 N NaOH.

A blank is prepared by following the foregoing procedure except that the acetone-ethanol solution is added before the enzyme preparation has been added and the contents of the flask incubated.

The enzyme activity is calculated as follows:

$$u./g. = \frac{(\text{ml. of NaOH for sample}) - (\text{ml. of NaOH for blank})}{\text{gms. of enzyme}} \times 2.5$$

For best results the amount of enzyme used in the foregoing test should be sufficient to yield a titration value of 1.0–2.0 ml. of 0.05 N NaOH.

We claim:

1. A dough comprising flour and a lipase preparation, the lipase preparation having the characteristics of exhibiting activity in the pH range of about 4.0 to 6.5, being substantially free from deleterious amounts of proteinases, amylases and reducing substances and having the ability to increase the extractable monoglyceride content of the dough.

2. A dough comprising flour, shortening and a lipase preparation, the lipase preparation having the characteristics of exhibiting activity in the pH range of about 4.0 to 6.5, being substantially free from deleterious amounts of proteinases, amylases and reducing substances and having the ability to increase the extractable monoglyceride content of the dough.

3. The dough of claim 2, wherein the lipase preparation is obtained from a material selected from the group consisting of ironweed seed and rapeseed.

4. The dough of claim 2, wherein the lipase preparation is added in an amount sufficient to increase the extractable monoglyceride content of bread prepared from said dough by at least 0.5 ounce per 100 pounds of flour.

5. A dough in accordance with claim 2 comprising flour and a defatted ironweed flour obtained from *Vernonia anthelmintica*, the amount of said ironweed flour being sufficient to increase the extractable monoglyceride content of said dough.

6. A dough in accordance with claim 2 comprising flour, shortening, and a defatted ironweed flour obtained from *Vernonia anthelmintica*, the defatted ironweed flour being present in an amount sufficient to increase the extractable monoglyceride content of the dough, after baking, by at least 0.5 ounce per 100 pounds of flour.

7. A dough according to claim 2 wherein said lipase is obtained from *Candida cylindracea* ATCC No. 14830 which has been cultivated in a suitable medium at a temperature between 20° and 35° C.

8. A dough according to claim 2 comprising flour and a rapseed lipase preparation, said preparation being present in an amount sufficient to increase the extractable monoglyceride content of said dough.

9. A dough according to claim 2 comprising flour, shortening and a rapeseed lipase preparation, the lipase preparation being present in an amount sufficient to increase the extractable monoglyceride content of the dough after baking by at least 0.5 ounce per 100 pounds of flour.

10. In a method of preparing baked goods from a dough, the steps comprising (1) the addition of a lipase preparation to said dough, the lipase preparation exhibiting activity in the pH range of about 4.0 to 6.5, being substantially free from deleterious amounts of proteinases, amylases and reducing substances, and having the ability to increase the extractable monoglyceride content of the dough, (2) permitting the lipase to increase the extractable monoglyceride content of the dough, and (3) inactivating the lipase.

11. The method of claim 10, wherein the lipase preparation is obtained from a material selected from the group consisting of ironweed seed and rapeseed.

12. The method of claim 10 wherein the lipase preparation is present in an amount sufficient to increase the extractable monoglyceride content of the bread by at least 0.5 ounce per 100 pounds of flour.

13. In a method of preparing baked goods from a dough in accordance with claim 10, the steps comprising (1) the addition of a defatted ironweed flour obtained from *Vernonia anthelmintica* to said dough, (2) placing the dough under conditions permitting the lipase to act upon shortening to increase the extractable monoglyceride content of the dough by at least 0.5 ounce per 100 pounds of flour, and (3) inactivating the lipase.

14. In a method of preparing baked goods from a shortening-containing dough in accordance with claim 10, the steps comprising (1) adding a rapeseed lipase preparation to the dough, (2) placing the dough under conditions permitting the lipase to act upon the shortening to increase the extractable monoglyceride content of the dough by at least 0.5 ounce per 100 pounds of flour, and (3) inacivating the lipase.

15. The method according to claim 10, wherein said lipase is obtained from *Candida cylindracea* ATCC No. 14830 which has been cultivated in a suitable medium at a temperature between 20° and 30° C.

References Cited
UNITED STATES PATENTS

| | | | |
|---|---|---|---|
| 2,615,810 | 10/1952 | Stone | 99—91 |
| 2,676,906 | 4/1954 | Rose et al. | 195—30 X |
| 2,875,064 | 2/1959 | Glabe | 99—91 |

LIONEL M. SHAPIRO, *Primary Examiner.*

JOSEPH M. GOLIAN, *Examiner.*